(12) United States Patent
Yoshimi et al.

(10) Patent No.: US 11,207,752 B2
(45) Date of Patent: Dec. 28, 2021

(54) LNK TYPE CLAMP DEVICE

(71) Applicant: KOSMEK LTD., Hyogo (JP)

(72) Inventors: Masahiro Yoshimi, Hyogo (JP); Keitaro Yonezawa, Hyogo (JP)

(73) Assignee: KOSMEK LTD., Hyogo (JP)

( * ) Notice: Subject to any disclaimer, the term of this patent is extended or adjusted under 35 U.S.C. 154(b) by 0 days.

(21) Appl. No.: 16/971,564

(22) PCT Filed: Jan. 22, 2019

(86) PCT No.: PCT/JP2019/001891
§ 371 (c)(1),
(2) Date: Aug. 20, 2020

(87) PCT Pub. No.: WO2019/176289
PCT Pub. Date: Sep. 19, 2019

(65) Prior Publication Data
US 2021/0053167 A1    Feb. 25, 2021

(30) Foreign Application Priority Data

Mar. 14, 2018 (JP) .............................. JP2018-047054
May 24, 2018 (JP) .............................. JP2018-099922

(51) Int. Cl.
*B23Q 3/06* (2006.01)
*B25B 5/00* (2006.01)

(52) U.S. Cl.
CPC ................ *B23Q 3/06* (2013.01); *B25B 5/006* (2013.01); *B23Q 2703/02* (2013.01)

(58) Field of Classification Search
CPC ...... B23Q 3/06; B23Q 2703/02; B25B 5/006; B25B 5/12

USPC ...................... 29/559; 269/32, 20, 24, 25, 27
See application file for complete search history.

(56) References Cited

U.S. PATENT DOCUMENTS 8,678,362 B1 * 3/2014 Luthi ...................... B25B 5/064
269/25
2003/0151183 A1   8/2003 Yokota
2017/0252902 A1 * 9/2017 Boiteux ................ B25B 5/062

FOREIGN PATENT DOCUMENTS

| JP | 11-170133 A | 6/1999 |
| JP | 2003-305617 A | 10/2003 |
| JP | 2014-534086 A | 12/2014 |
| JP | 2017-529503 A | 10/2017 |

OTHER PUBLICATIONS

International Search Report for PCT/JP2019/001891 dated Apr. 17, 2019.
Office Action dated Aug. 4, 2021 cited in Chinese Patent Appln. No. CN201980018355.4 along with Machine English Translation.

* cited by examiner

*Primary Examiner* — Lee D Wilson
*Assistant Examiner* — Alberto Saenz
(74) *Attorney, Agent, or Firm* — Bacon & Thomas, PLLC

(57) ABSTRACT

A clamping device (2) includes: a turning-supporting member (26) formed so as to support a housing (3) which turns when a clamping position is set, the housing (3) turning toward a desired turning angle position about an axis of the housing (3) while maintaining the axis at a constant position; and a bolt (46) which fixes the housing (3) to the turning-supporting member (26) at the desired turning angle position.

10 Claims, 12 Drawing Sheets

LNK TYPE CLAMP DEVICE

TECHNICAL FIELD

The present invention relates to a link-type clamping device.

BACKGROUND ART

Such a link-type clamping device, for example, has the following configuration as disclosed in Patent Literature 1 (Pamphlet of International Publication No. WO2008/126598).

A rod is inserted into a housing so as to be movable in a vertical direction. A left end part of a clamp arm is connected to an upper part of the rod so as to be swingable in the vertical direction. The housing includes a support part along an outer circumference of an upper part of the housing. An annular supported member is mounted to the support part so as to be turnable about an axis of the supported member. The supported member includes a pivotably supporting portion, to which an intermediate part of the clamp arm in a longitudinal direction of the clamp arm is connected via a link member. A receiving means is provided to the support part and the supported member. In a clamping operation, the receiving means receives an upward force that acts upward from the link member to the pivotably supporting portion. The supported member is fixed to the support part by a locking means at a desired turning angle position.

The receiving means includes at least one male screw region which is formed along an outer circumference of the support part of the housing and at least one female screw region which is formed along an inner circumference of the supported member such that the female screw region is fitted to the male screw region so as to be movable in the vertical direction.

To change a clamping position of the clamp arm to a desired turning angle position about an axis of the rod, the following steps can be taken. First, in a state where fixation of the supported member by the locking means has been released, the supported member is turned with respect to the support part about the axis of the supported member by the above predetermined angle, and then the supported member at the desired turning angle position is fixed to the support part by the locking means.

This enables easily setting the clamping position of the clamp arm to a desired turning angle position about the axis of the rod.

CITATION LIST

Patent Literature

[Patent Literature 1]
Pamphlet of International Publication No. WO2008/126598 (Publication Date: Oct. 23, 2008)

SUMMARY OF INVENTION

Technical Problem

However, the above conventional technique has the following problems.

Since the supported member turns with respect to the support part by the fitting of the male screw region on the outer circumference of the support part of the housing and the female screw region on the inner circumference of the supported member to each other, the supported member becomes slightly displaced in the vertical direction. Accordingly, the clamp arm whose position is changed to a desired turning angle position is also slightly displaced in the vertical direction. Further, in a release state in which clamping has been released and the clamp arm has swung away from the workpiece, changing a position of the clamp arm to a desired turning angle position causes the clamp arm to be slightly displaced. Further, a preadjusted horizontal state of the clamp arm at a clamping position is also slightly disrupted.

There is thus room for improvement in a configuration in which the clamping position of the clamp arm is changed to a desired turning angle position about the axis of the rod.

It is an object of an aspect of the present invention to provide a link-type clamping device which enables accurately changing a clamping position to a desired turning angle position about an axis.

Solution to Problem

In order to attain the above object, embodiments of the present invention include a link-type clamping device which is for example configured as follows and as illustrated in FIGS. 1 to 5, or FIGS. 6 and 7, or FIGS. 8 to 11, or FIG. 12.

A link-type clamping device includes: a housing 3 into which a rod 12 is inserted so as to be movable in a vertical direction; a clamp arm 30 connected to an upper part of the rod 12 so as to be swingable in the vertical direction; a link member 33 including a link lower part 35 connected swingably to the housing 3 and a link upper part 34 connected swingably to the clamp arm 30; a turning-supporting member 26 formed so as to support the housing 3 which turns when a clamping position is set, the housing 3 turning toward a desired turning angle position about an axis of the housing 3 while maintaining the axis at a constant position; and a bolt 46 which fixes the housing 3 to the turning-supporting member 26 at the desired turning angle position.

The above aspect of the present invention has the following effects.

To change a clamping position of the clamp arm to a desired turning angle position about an axis of the rod, the following steps can be taken. First, in a state where fixation of the turning-supporting member by the lock member has been released, the housing is turned with respect to the turning-supporting member about the axis of the housing by a predetermined angle, and then the housing at the desired turning angle position is fixed to the turning-supporting member by the lock member.

Since the turning-supporting member is provided so as to allow the housing to turn toward a desired turning angle position about the axis of the housing while maintaining the axis at a constant position, the clamp arm whose position is changed to a desired turning angle position is maintained at a constant position in the vertical direction, unlike the conventional techniques.

Further, in a release state in which clamping has been released and the clamp arm has swung away from the workpiece, the clamp arm is maintained at a constant position.

Further, a preadjusted horizontal state of the clamp arm at a clamping position is also maintained constant.

Therefore, it is possible to change a clamping position of the clamp arm accurately to a desired turning angle position about the axis.

In an aspect of the present invention, the following configuration can be preferably added.

The link-type clamping device further includes a receiving member B provided between the housing 3 and the turning-supporting member 26 so as to receive an upward force that acts on the housing 3 from the link member 33 in a clamping operation, the housing 3 having a transmitting surface 37 which transmits, to the receiving member B, the upward force acting on the housing 3, the turning-supporting member 26 having a receiving surface 27 which receives the upward force transmitted to the receiving member B.

This allows an upward force that acts on the housing from the link member in a clamping operation to be reliably received by the transmitting surface, the receiving member, and the receiving surface.

In an aspect of the present invention, the following configuration can be preferably added.

The receiving member B includes a retaining ring 38 arranged along an outer circumference of the housing 3.

In this configuration, the retaining ring is mounted to the housing in an integral manner and therefore is unlikely to be lost during disassembly for a setup change or the like. This enables easy handling.

In an aspect of the present invention, the following configuration can be preferably added.

The receiving member B includes a plurality of wedge members 41 arranged at predetermined intervals along an outer circumference of the housing 3.

This allows an upward force that acts on the housing from the link member in a clamping operation to be firmly received due to a wedging effect of the wedge members.

In an aspect of the present invention, the following configuration can be preferably added.

The turning-supporting member 26 is provided such that the turning-supporting member 26 is movable toward an upper side of the housing 3 so as to allow the retaining ring 38 to be mounted between the housing 3 and the turning-supporting member 26 from a lower side of the housing 3.

This allows the retaining ring for receiving an upward force that acts on the housing from the link member in a clamping operation to be easily provided between the housing and the turning-supporting member.

In an aspect of the present invention, the following configuration can be preferably added as illustrated, for example, in FIGS. 8 to 11.

The housing 3 includes a pivotably supporting portion 28 for connecting the link lower part 35 to the housing 3, the pivotably supporting portion 28 protruding radially outward from an outer circumferential wall 3d of the housing 3 and upward from the housing 3; and the turning-supporting member 26 includes an inner circumferential wall 52 including a clearance recess 51 for allowing the turning-supporting member 26 to be attached to the housing 3 from above the housing 3.

In this case, due to including the clearance recess, the turning-supporting member can be attached to the housing from above the housing so as to avoid the pivotably supporting portion. It is thus possible to provide the link-type clamping device which is capable of pressing a workpiece downward by effective use of a force of the rod and is excellent in assemblability.

In an aspect of the present invention, the following configuration can be preferably added.

The inner circumferential wall 52 of the turning-supporting member 26 has a large-diameter hole 53 and a small-diameter hole 54, which are provided in this order from a lower side of the turning-supporting member 26; and the clearance recess 51 is formed, in a circumferential direction, at a portion of the small-diameter hole 54.

In this case, it is easy to form the clearance recess for allowing the turning-supporting member to avoid interference with the pivotably supporting portion when the turning-supporting member is attached.

In an aspect of the present invention, the following configuration can be preferably added.

The housing 3 includes a flange portion 58 protruding from the outer circumferential wall 3d toward the large-diameter hole 53; the flange portion 58 has a transmitting surface 59 which transmits, to the turning-supporting member 26, an upward force acting on the housing 3; and a receiving surface 56 which receives the upward force transmitted from the transmitting surface 59 is formed at a step portion 55 between the large-diameter hole 53 and the small-diameter hole 54.

This allows an upward force that acts on the housing from the link member in a clamping operation to be reliably received by the transmitting surface and the receiving surface without provision of a receiving member.

In an aspect of the present invention, the following configuration can be preferably added.

The turning-supporting member 26 includes a cover portion 50 which protrudes radially inward from the inner circumferential wall 52 above the clearance recess 51 so as to abut on the outer circumferential wall 3d of the housing 3.

In this case, the cover portion enables preventing a foreign matter such as chips from entering a gap between the turning-supporting member and the housing.

In an aspect of the present invention, the following configuration can be preferably added.

The housing 3 includes: annular grooves 63, 64 each formed in an outer circumferential wall of the housing 3 in a circumferential direction; and fluid supply-and-discharge ports (pressurized oil supply-and-discharge ports 17, 21) respectively formed in the annular grooves 63, 64 so as to supply and discharge a pressurized fluid that causes the rod 12 to move in the vertical direction.

With this configuration, even in a case where positions of the fluid supply-and-discharge ports are changed by turning of the housing toward a desired turning angle position when a clamping position is set, supply and discharge of a fluid between fluid supply-and-discharge ports that are formed in a table and the fluid supply-and-discharge ports that are formed in the housing can be carried out via the annular grooves without requiring a setup change.

In an aspect of the present invention, the following configuration can be preferably added.

The link-type clamping device further includes a male screw portion 70 formed at an outer circumferential wall of the housing 3; and a female screw portion 71 formed at an inner circumferential wall of the turning-supporting member 26, the male screw portion 70 and the female screw portion 71 being provided for receiving an upward force that acts on the housing 3 from the link member 33 in a clamping operation, the turning-supporting member 26 receiving, via the male screw portion 70 and the female screw portion 71, the upward force that acts on the housing 3.

In this case, the turning-supporting member is supposed to be displaced in the vertical direction when the turning-supporting member is turned with respect to the male screw portion. However, since the seating portion of the housing is received from below by the taper face at a hole in the table, displacement of the housing itself in the vertical direction does not occur. Accordingly, the clamp arm whose position is changed to a desired turning angle position is not displaced in the vertical direction.

Figure 7:
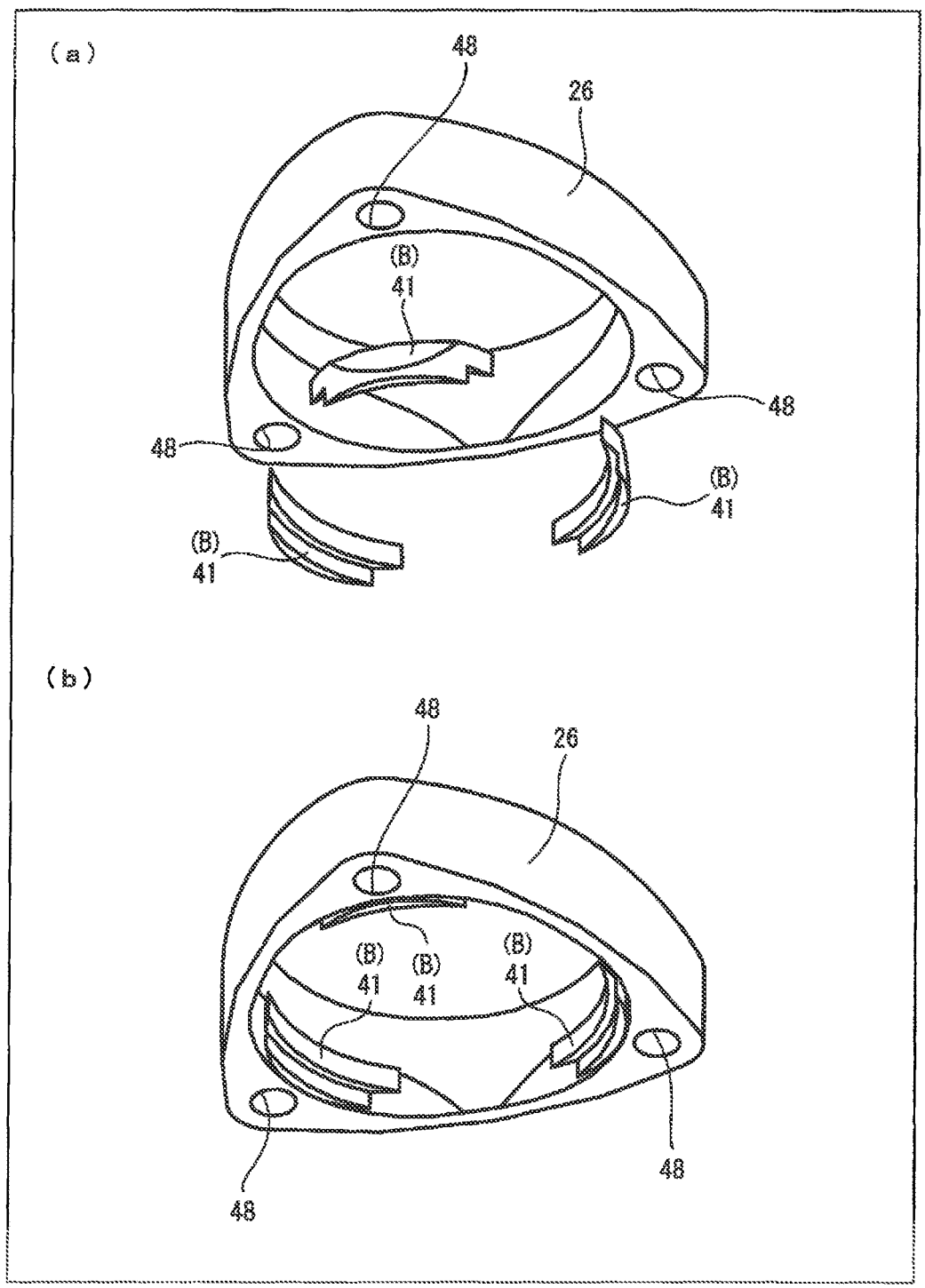

(a) of FIG. 7 is a perspective view illustrating a turning-supporting member and wedge members of the link-type clamping device. (b) of FIG. 7 is a perspective view illustrating the wedge members mounted to the turning-supporting member.

Figure 8:
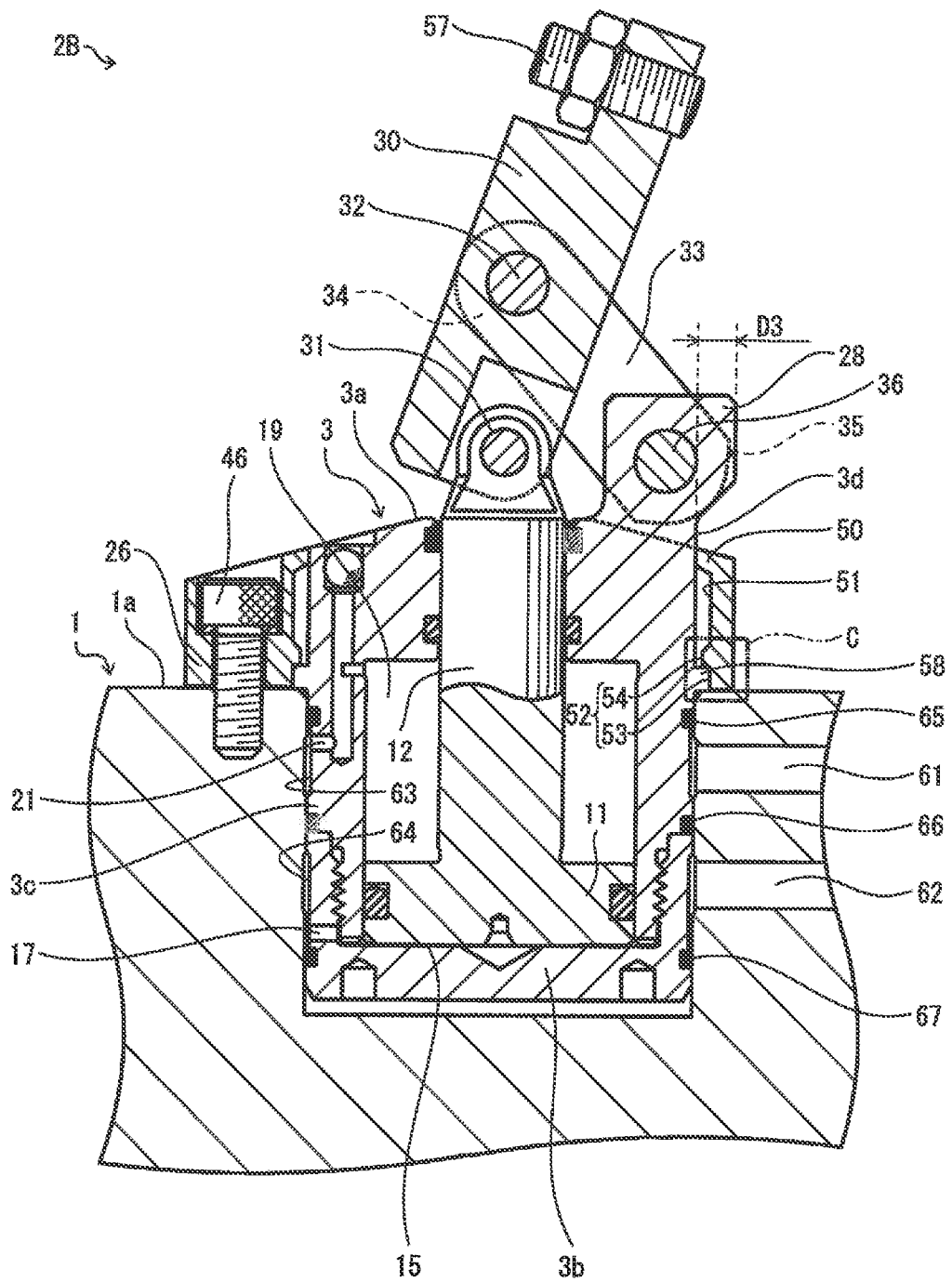

FIG. 8 is a vertical cross-sectional view of Embodiment 3 of the present invention and illustrates a link-type clamping device in an unclamping state.

Figure 9:
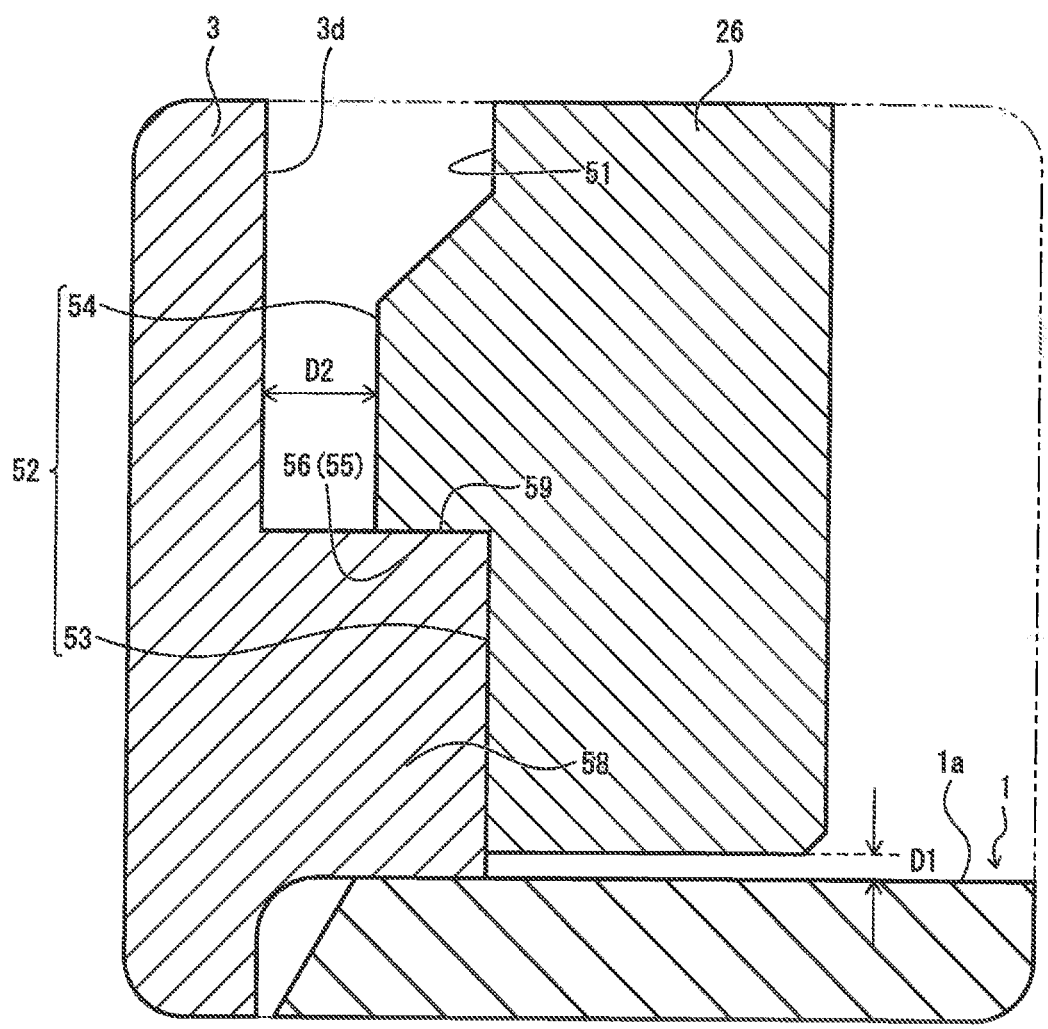

FIG. 9 is an enlarged cross-sectional view of a portion C illustrated in FIG. 8.

Figure 10:
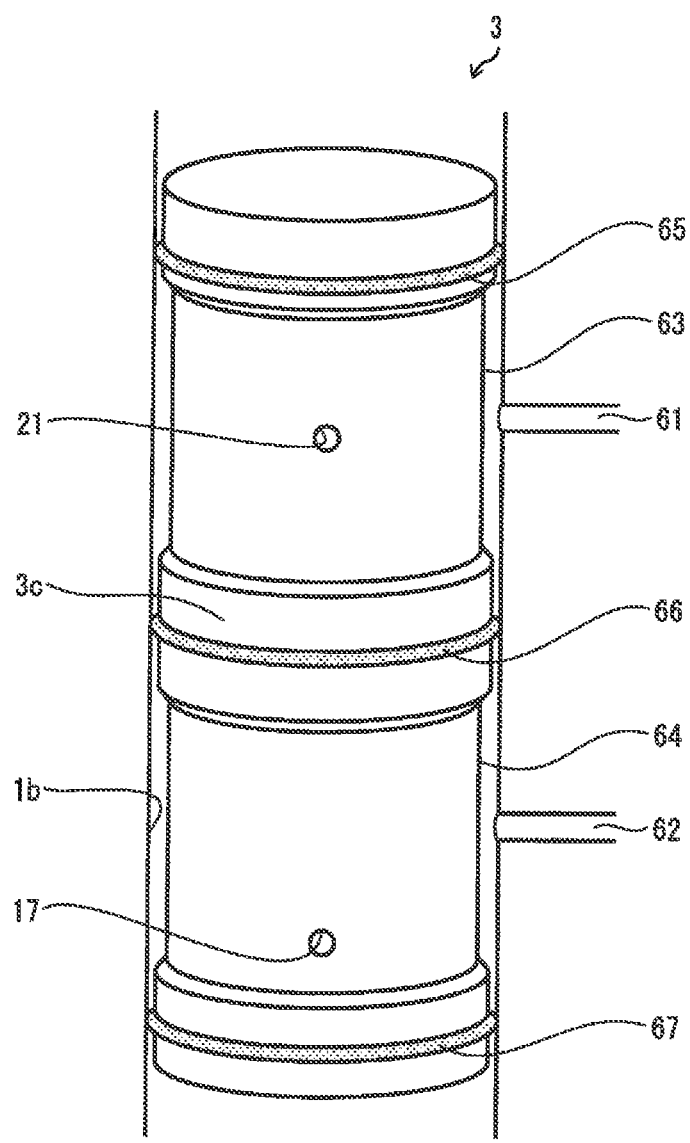

FIG. 10 is a view schematically illustrating annular grooves formed in a housing of the link-type clamping device.

Figure 11:
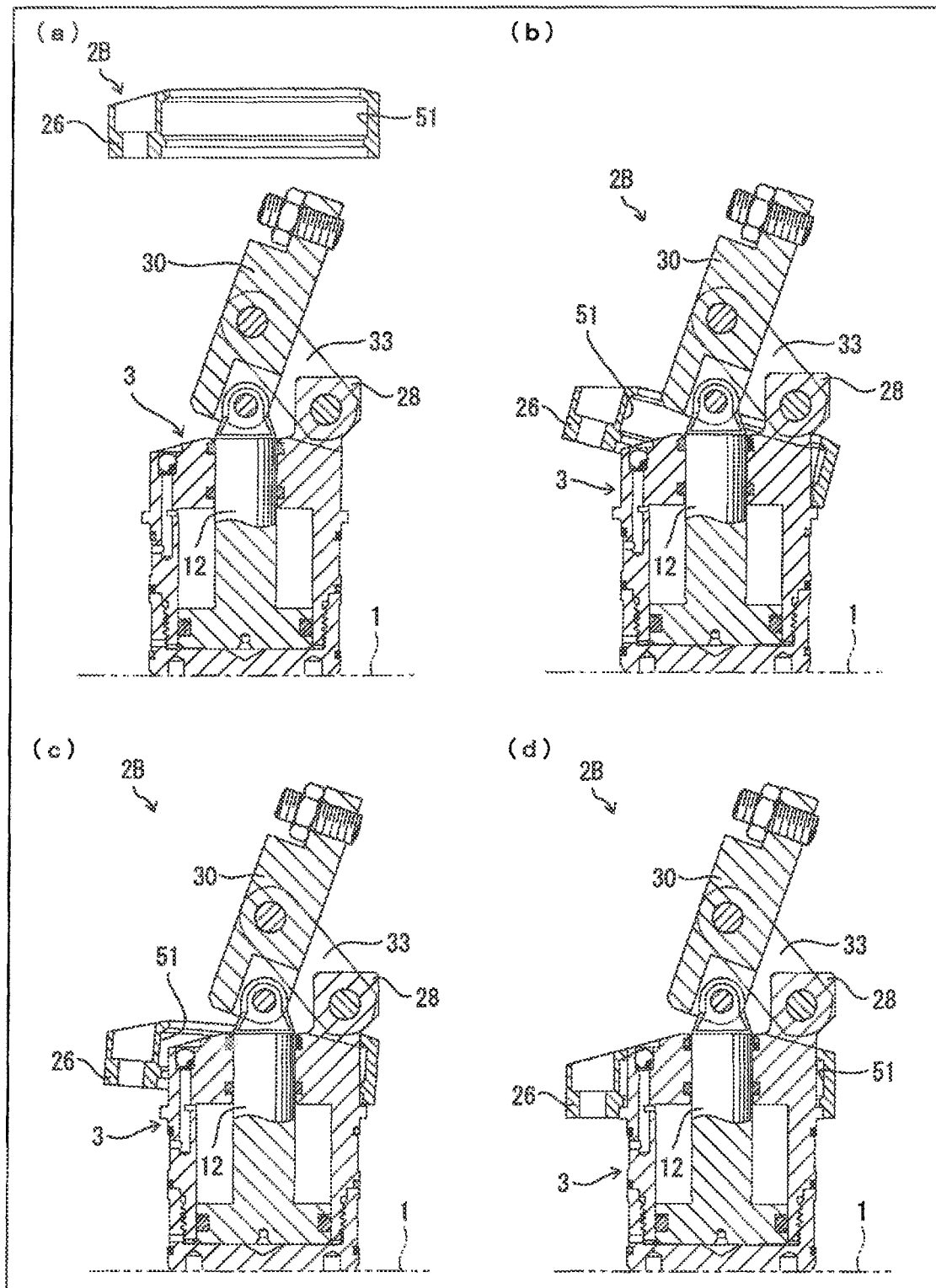

(a) to (c) of FIG. 11 are vertical cross-sectional views illustrating a detailed aspect in which the turning-supporting member is attached to the housing from above the housing.

Figure 12:
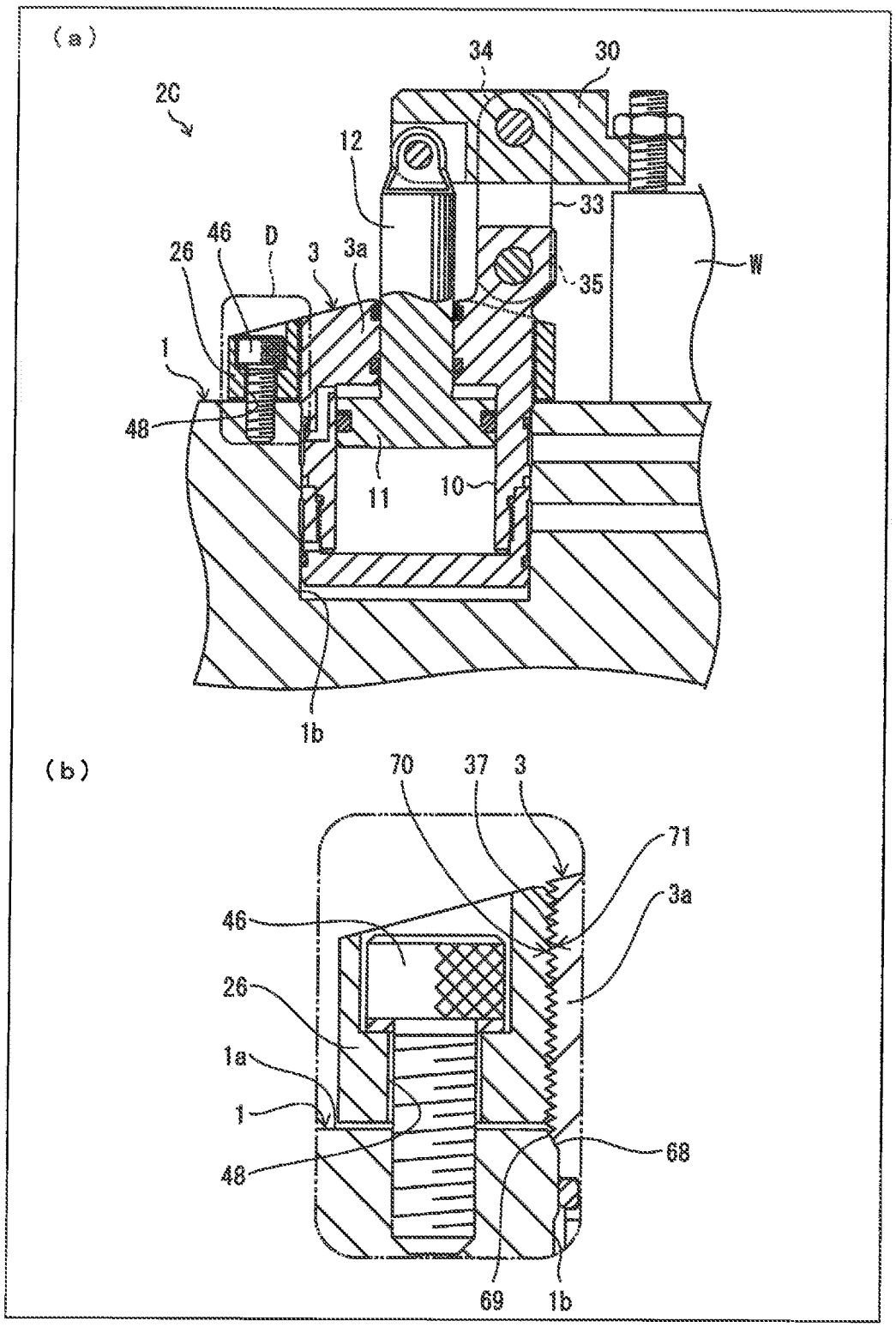

FIG. 12 illustrates Embodiment 4 of the present invention. (a) of FIG. 12 is a vertical cross-sectional view of a link-type clamping device in a clamping state. (b) of FIG. 12 is an enlarged cross-sectional view of a portion D illustrated in (a) of FIG. 12.

DESCRIPTION OF EMBODIMENTS

Embodiment 1

The following description will discuss Embodiment 1 of the present invention with reference to FIGS. 1 to 5.

Figure 1:
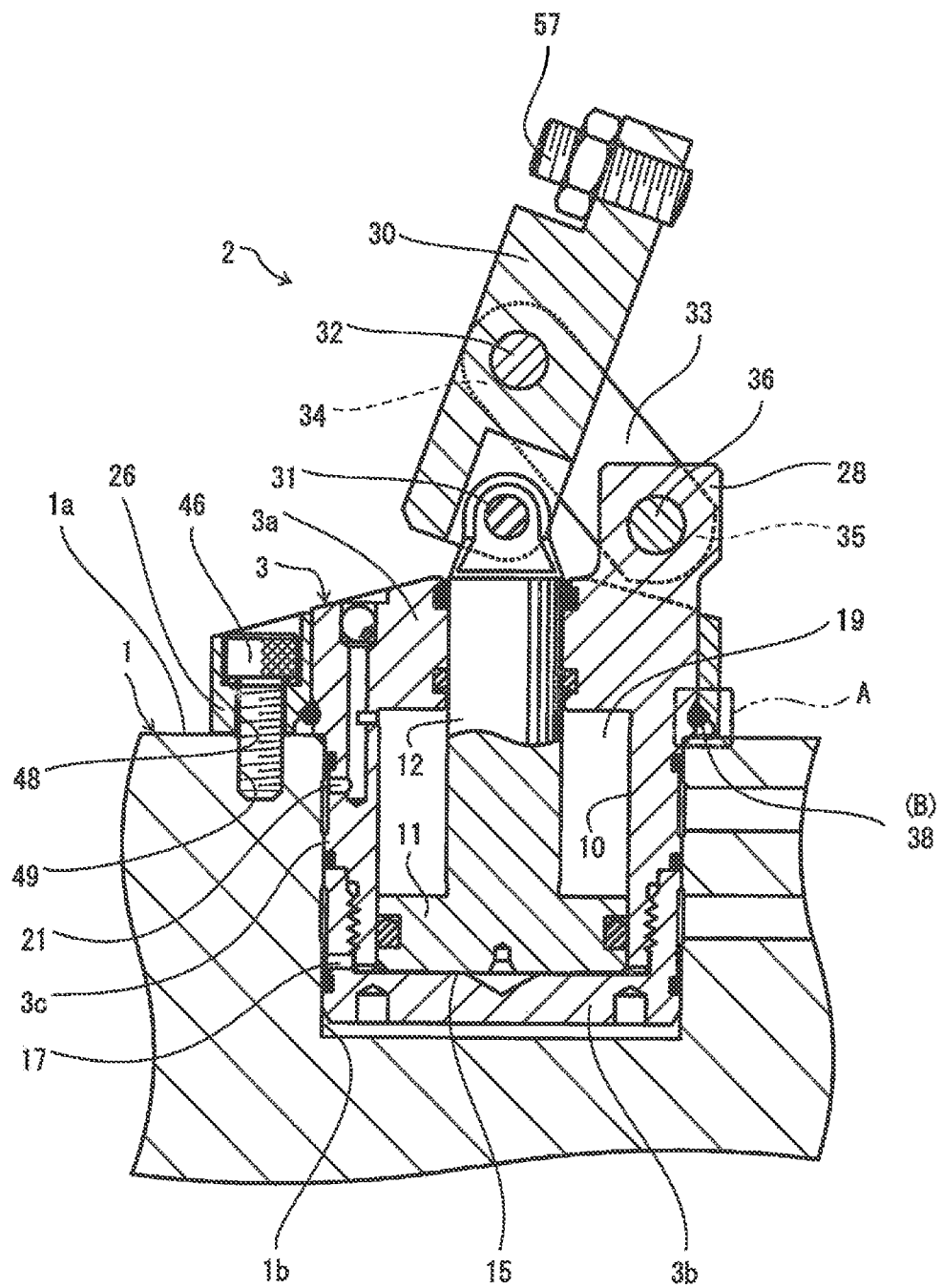
FIG. 1 is a vertical cross-sectional view of Embodiment 1 of the present invention and illustrates a link-type clamping device in an unclamping state.
Figure 2:
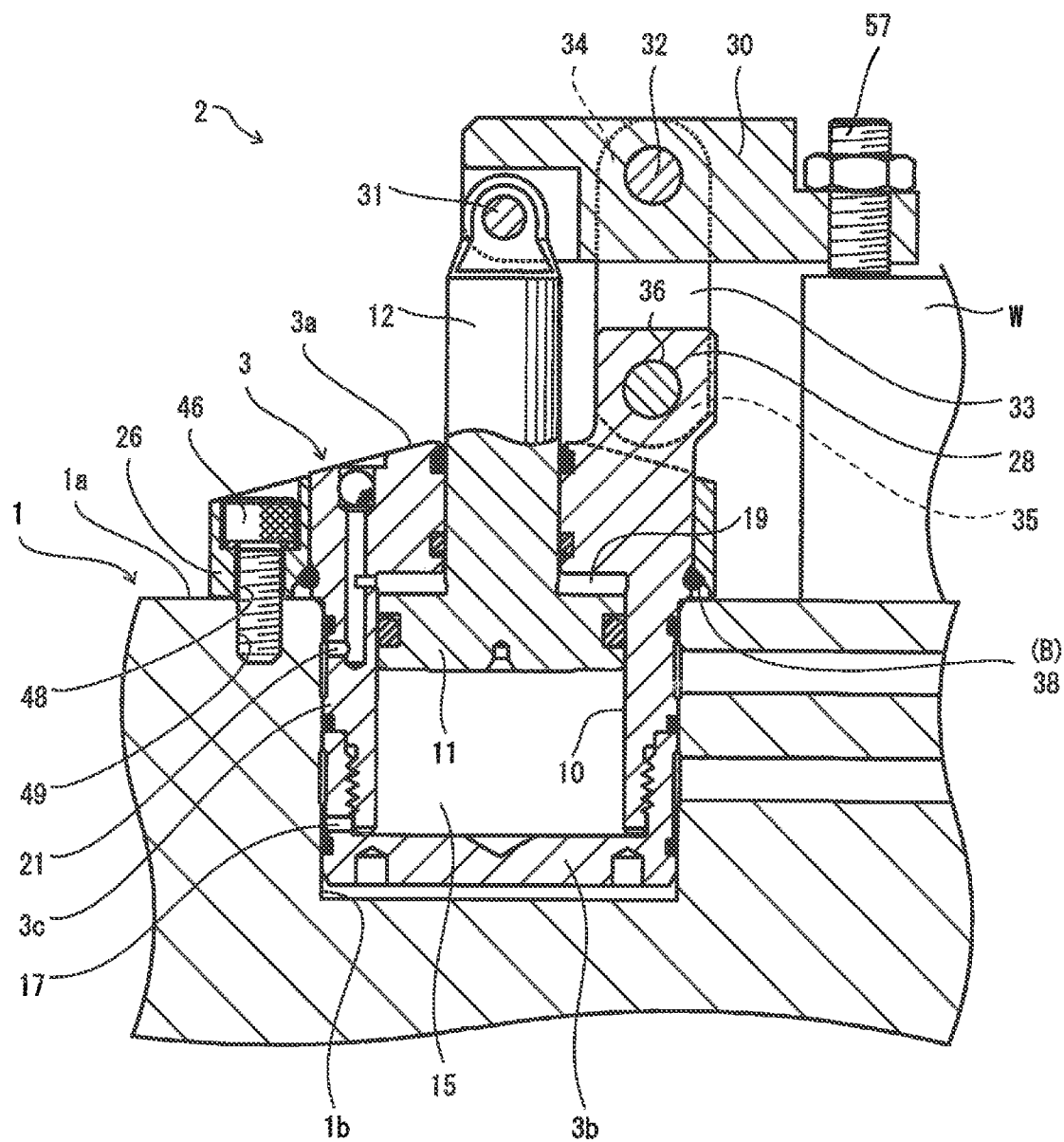
FIG. 2 is a vertical cross-sectional view of the link-type clamping device in a clamping state.
Figure 3:
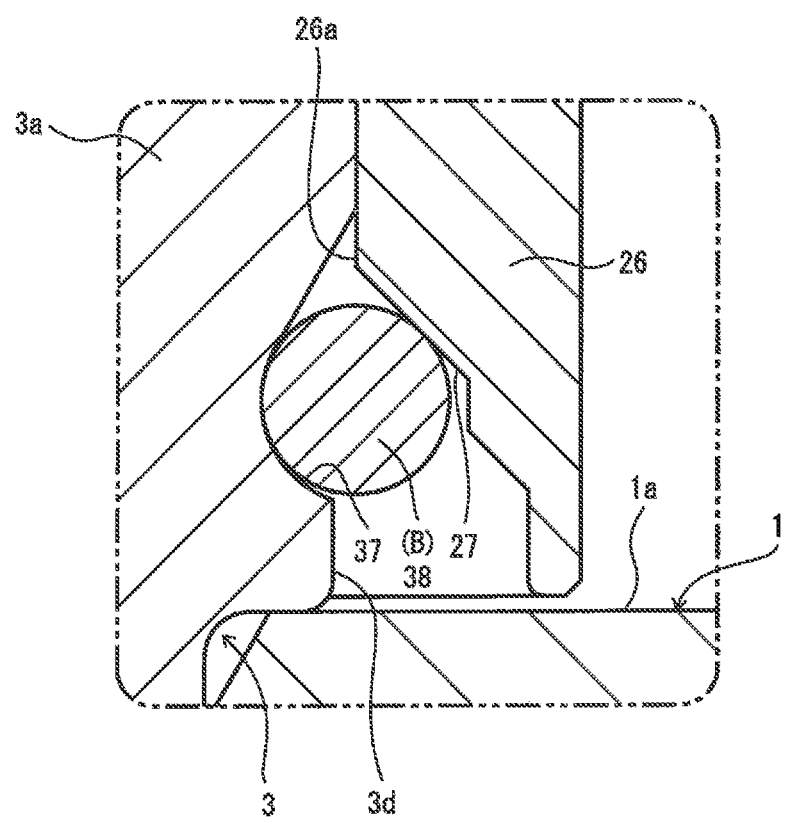
FIG. 3 is an enlarged cross-sectional view of a portion A illustrated in FIG. 1.
Figure 4:
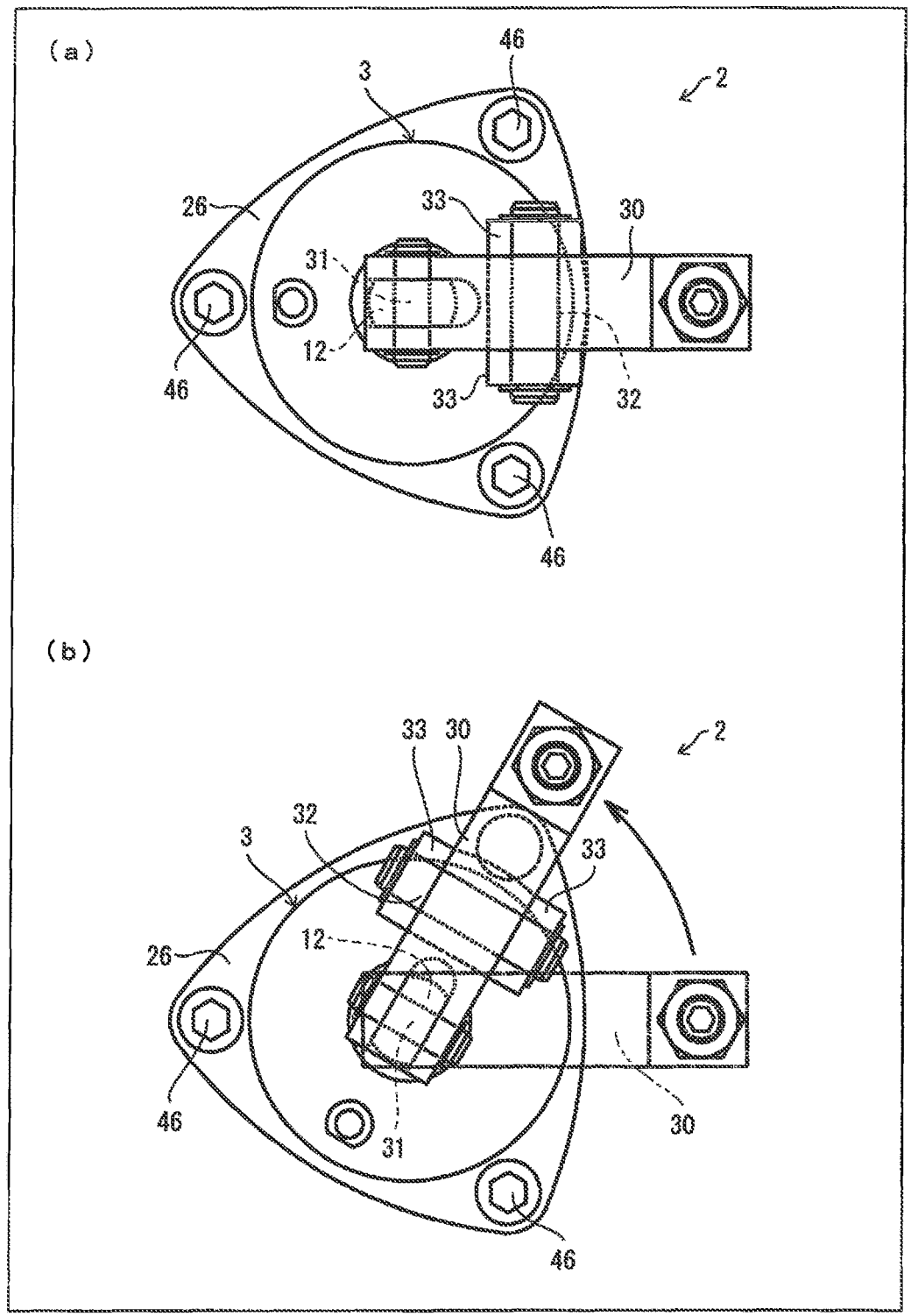
FIG. 4 is plan views of the link-type clamping device. (a) of FIG. 4 is a plan view illustrating a state in which a clamping position has not been set, (b) of FIG. 4 is a plan view illustrating a state in which a clamping position has been set.

FIG. 1 is a vertical cross-sectional view of Embodiment 1 of the present invention and illustrates a link-type clamping device 2 in an unclamping state. FIG. 2 is a vertical cross-sectional view of the link-type clamping device 2 in a clamping state. FIG. 3 is an enlarged cross-sectional view of a portion A illustrated in FIG. 1. FIG. 4 is plan views of the link-type clamping device 2. (a) of FIG. 4 is a plan view illustrating a state in which a clamping position has not been set. (b) of FIG. 4 is a plan view illustrating a state in which a clamping position has been set.

In Embodiment 1, a case where the link-type clamping device 2 is arranged on a table 1 serving as a fixing base is taken as an example. The clamping device 2 has a cylindrical housing 3 which is inserted into a hole 1b provided in an upper surface 1a of the table 1.

A workpiece W placed on the upper surface 1a of the table 1 is fixed by the clamping device 2.

A piston 11 is hermetically inserted into a cylinder hole 10 of the housing 3 so as to be movable in a vertical direction. A rod 12 is provided to the piston 11 in an integrated manner so as to protrude upward therefrom. The rod 12 is hermetically inserted into an upper wall 3a of the housing 3 so as to be movable in the vertical direction. A clamp chamber 15 formed between a lower wall 3b of the housing 3 and the piston 11 is communicated with a pressurized oil supply-and-discharge port 17 for clamping, which pressurized oil supply-and-discharge port 17 is provided in a barrel part 3c of the housing 3.

An unclamp chamber 19 formed between the upper wall 3a of the housing 3 and the piston 11 is communicated with a pressurized oil supply-and-discharge port 21 for unclamping, which pressurized oil supply-and-discharge port 21 is provided in the barrel part 3c of the housing 3.

A pivotably supporting portion 28 is provided to a part of the upper wall 3a of the housing 3 in an integrated manner so as to protrude upward from the part. A left end part (one end part) of a clamp arm 13 in a longitudinal direction of the clamp arm 30 is connected swingably in a vertical plane to an upper part of the rod 12 via a first pin 31. An intermediate part of the clamp arm 30 in the longitudinal direction of the clamp arm 30 is connected swingably in a vertical plane to a link upper part 34 of a link member 33 via a second pin 32. A link lower part 35 of the link member 33 is connected swingably to the pivotably supporting portion 28 via a third pin 36. Note that as illustrated in FIG. 4, two link members 33 are provided so as to sandwich the pivotably supporting portion 28 and the clamp arm 30 therebetween. In FIGS. 1 and 2, however, only one of the link members 33 is illustrated.

The barrel part 3c of the housing 3 is inserted into the hole 1b, which is provided in the upper surface 1a of the table 1, so as to be turnable about an axis of the housing 3 while maintaining the axis at a constant position. A lower surface of the upper wall 3a of the housing 3 is supported from below by the upper surface 1a of the table 1. In Embodiment, the housing 3 is hermetically fitted into the hole 1b in the table 1 in a state where the housing 3 has been turned about the axis of the housing 3 in a desired direction.

As illustrated in FIG. 3, a transmitting surface 37 is provided on an outer circumferential wall 3d of the upper wall 3a of the housing 3 in a circumferential direction. A retaining ring 38 having a circular cross section is mounted to the transmitting surface 37.

An annular turning-supporting member 26 is externally fitted to an outer circumferential portion of the upper wall 3a of the housing 3. An inner circumferential surface 26a of the turning-supporting member 26 is formed so as to become increasingly near to the axis of the housing 3 in an upward direction. The turning-supporting member 26 fixes, to the table 1 via the retaining ring 38, the housing 3 which was turned toward a desired turning angle position about the axis of the housing 3 while maintaining the axis at a constant position when a clamping position was set. At this time, a gap is formed between the upper surface 1a of the table 1 and a lower surface of the turning-supporting member 26. Accordingly, as illustrated in FIGS. 1 and 3, a downward fastening force of the bolt 46 acts in a direction in which the housing 3 is pressed against the table 1 via the turning-supporting member 26 and the retaining ring 38. This enables reliably securing the housing 3 to the table 1.

In a clamping operation, a reaction force of a force with which the clamp arm 30 presses the workpiece W acts on the housing 3 as a force of the third pin 36, and this upward force is reliably received from above by the turning-supporting member 26, which is fixed to the table 1, via the retaining ring 38 which serves as a receiving member B.

A leg part of the bolt 46 inserted into a bolt insertion hole 48 of the turning-supporting member 26 is screwed into a female screw hole 49 in the upper surface 1a of the table 1.

Figure 5:
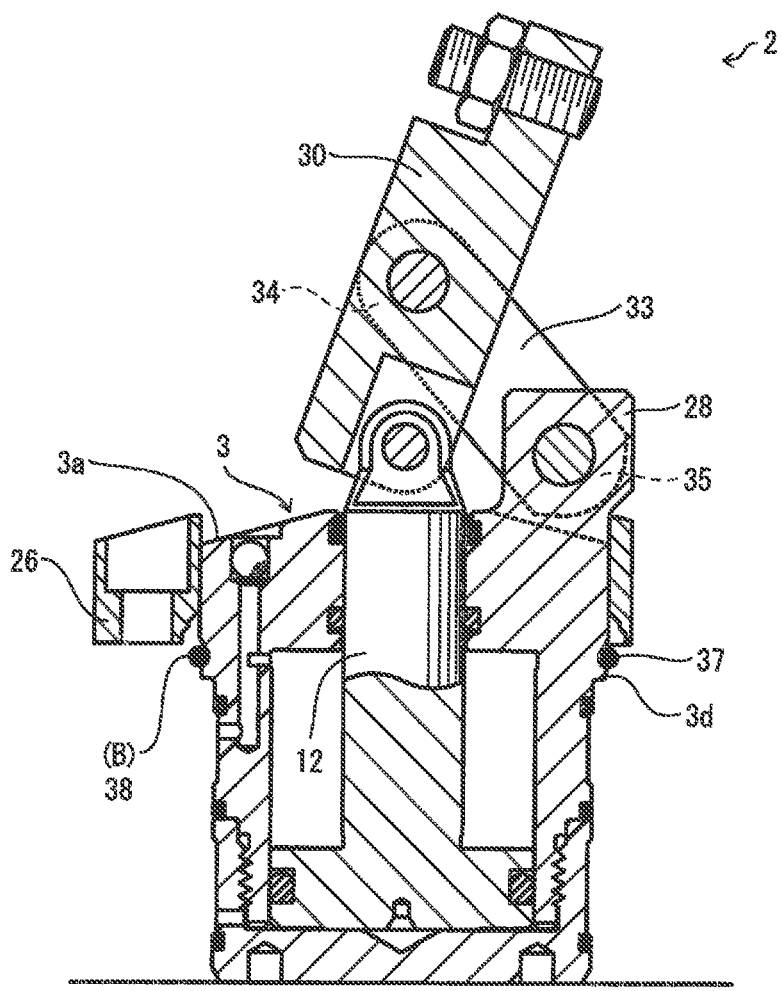
FIG. 5 is a vertical cross-sectional view illustrating an aspect in which a retaining ring is provided between a housing and a turning-supporting member of the link-type clamping device.

FIG. 5 is a vertical cross-sectional view illustrating an aspect in which the retaining ring 38 is provided between the housing 3 and the turning-supporting member 26 of the link-type clamping device 2.

As illustrated in FIG. 3, the turning-supporting member 26 is provided so as to be movable toward an upper side of the housing 3 such that the transmitting surface 37 formed on a circumferential surface of the upper wall 3a of the housing 3 is exposed. Accordingly, in a state where the turning-supporting member 26 has moved toward the upper side of the housing 3 so as to expose the transmitting surface 37, the retaining ring 38 can be easily mounted, from a lower side of the housing 3, to a groove in which the transmitting surface 37 is provided.

Further, the retaining ring 38 reliably prevents the turning-supporting member 26 from coming off downward from the outer circumferential wall of the upper wall 3a of the housing 3.

The clamping device 2 operates as follows.

In a clamping operation, as illustrated in FIGS. 1 and 2, pressurized oil in the unclamp chamber 19 is discharged and pressurized oil is supplied to the clamp chamber 15, so that the rod 12 is elevated to cause the clamp arm 30 to be driven clockwise about the second pin 32. This causes a machine bolt 57, which is provided at a right end part of the clamp arm 30, to press the workpiece W downward. Further, in the clamping operation, a reaction force of a force with which the clamp arm 30 presses the workpiece W acts on the housing 3 as a force of the third pin 36, and this upward force is reliably received from above by a receiving surface 27 of the turning-supporting member 26, which is fixed to the table 1, via the retaining ring 38 which serves as the receiving member B.

In contrast, in unclamping, pressurized oil in the clamp chamber 15 is discharged and pressurized oil is supplied to the unclamp chamber 19. This causes the rod 12 to descend, so that the clamp arm 30 retreats counterclockwise.

To change a clamping position of the clamp arm 30 to a desired turning angle position about an axis of the rod 12, the following steps can be taken. First, in a state where fixation of the housing 3 to the turning-supporting member 26 by the bolt 46 has been released, the housing 3 is turned with respect to the turning-supporting member 26 about an axis of the housing 3 by a predetermined angle, and then the housing 3 at the desired turning angle position is fixed to the turning-supporting member 26 by the bolt 46.

Since the turning-supporting member 26 is provided so as to allow the housing 3 to turn toward a desired turning angle position about the axis of the housing 3 while maintaining the axis at a constant position, the clamp arm 30 whose position is changed to a desired turning angle position is maintained at a constant position in a vertical direction, unlike the conventional techniques.

Further, in a release state in which clamping has been released and the clamp arm 30 has swung away from the workpiece W, the clamp arm 30 is maintained at a constant position.

Further, a preadjusted horizontal state of the clamp arm 30 at a clamping position is also maintained constant.

Therefore, it is possible to change a clamping position of the clamp arm 30 accurately to a desired turning angle position about the axis.

Embodiment 2

Figure 6:
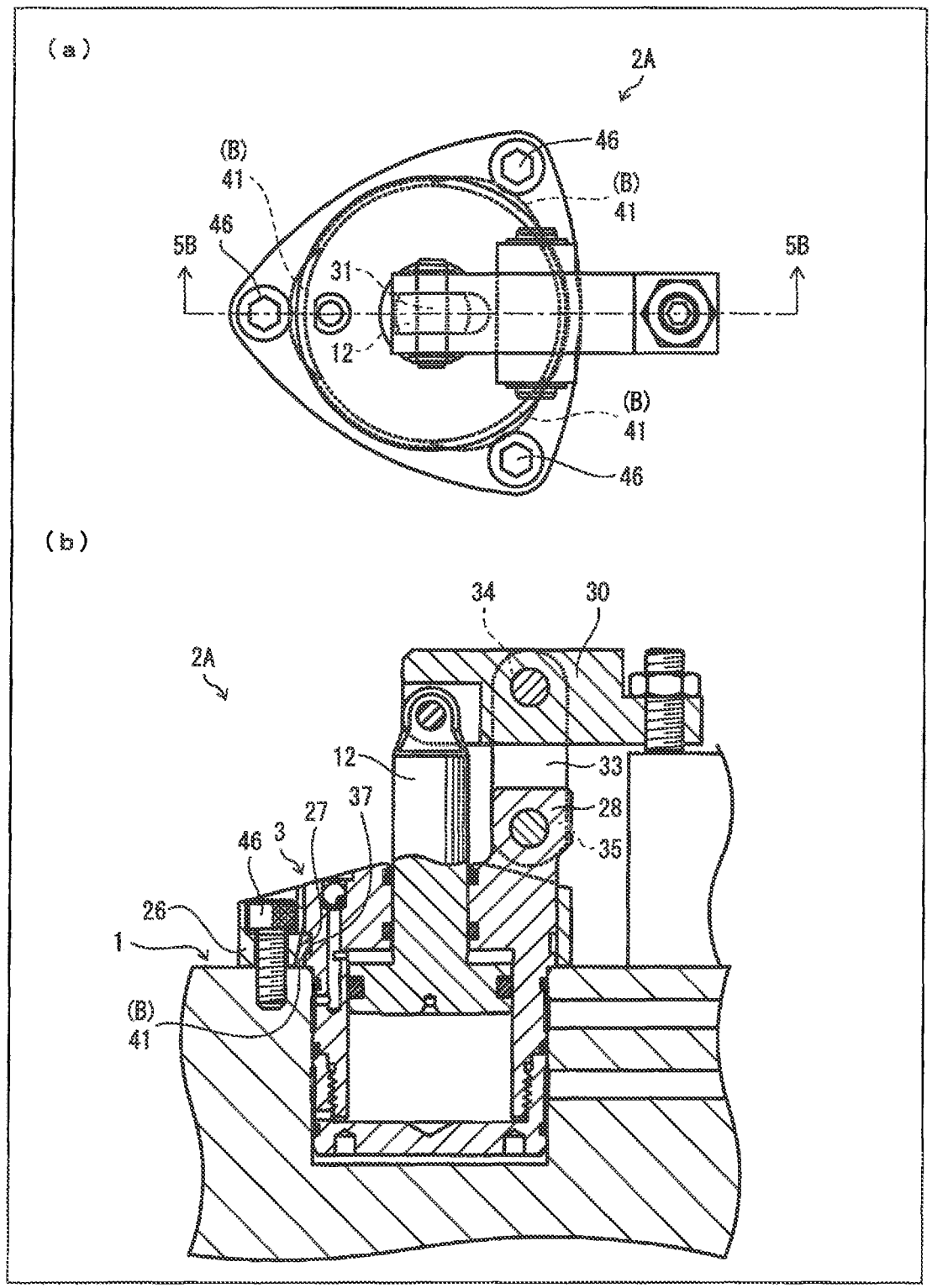
FIG. 6 illustrates Embodiment 2 of the present invention. (a) of FIG. 6 is a plan view of a link-type clamping device. (b) of FIG. 6 is a vertical cross-sectional view of the link-type clamping device, taken along a line 5B-5B of (a) of FIG. 6.

The following description will discuss Embodiment 2 of the present invention with reference to FIGS. 6 and 7. FIG. 6 illustrates Embodiment 2 of the present invention. (a) of FIG. 6 is a plan view of a link-type clamping device 2A. (b) of FIG. 6 is a vertical cross-sectional view of the link-type clamping device 2A, taken along a line 5B-5B of (a) of FIG. 6.

Embodiment 2 differs from Embodiment 1 on the following points.

Serving as the above-described receiving member B, a plurality of wedge members 41 are arranged at predetermined intervals along an outer circumference of a housing 3. In an example illustrated in FIG. 7, three wedge members 41 are arranged at equal intervals along an inner circumference of a turning-supporting member 26.

Embodiment 2 brings about the following advantages.

As with Embodiment 1, when a clamping position of a clamp arm 30 is changed to a desired turning angle position about an axis of a rod 12 and then the turning-supporting member 26 is fastened to a table 1 by a bolt 46, the three wedge members 41 firmly press the housing 3 toward the axis from respective different three directions that differ from one another by 120°. This prevents the housing 3 from becoming displaced from a predetermined center position in a horizontal direction and thereby enables firmly fixing the housing 3 at the predetermined center position.

Embodiment 3

The following description will discuss Embodiment 3 of the present invention with reference to FIGS. 8 to 14.

FIG. 8 is a vertical cross-sectional view of Embodiment 3 of the present invention and illustrates a link-type clamping device 2B in an unclamping state. FIG. 9 is an enlarged cross-sectional view of a portion C illustrated in FIG. 8. FIG. 10 is a view schematically illustrating annular grooves 63 and 64 formed in a housing 3 of the link-type clamping device 2B.

A pivotably supporting portion 28 protrudes upward from the housing 3. The pivotably supporting portion 28 protrudes from an outer circumferential wall 3d of the housing 3 radially outward by a dimension D3. This configuration is employed for the following reason. As illustrated in FIG. 2, in accordance with the principle of leverage with a first pin 31 serving as a point of effort, a third pin 36 serving as a fulcrum, and a machine bolt 57 serving as a point of load, a link member 33 in a posture parallel to an axis of a rod 12 presses a workpiece W downward. As such, in a case where the pivotably supporting portion 28 protrudes radially outward from the outer circumferential wall 3d so as to increase a distance between the point of effort (the first pin 31) and the fulcrum (the third pin 36, a second pin 32), it is possible to press the workpiece W downward more firmly with more effective use of a force of the rod 12.

Embodiment 3 differs from Embodiments 1 and 2 an the following point.

The link-type clamping device 2B includes neither the retaining ring 38 nor the wedge members 41.

An inner circumferential wall 52 of a turning-supporting member 26 has a large-diameter hole 53 and a small-diameter hole 54, which are provided in this order from a lower side of the turning-supporting member 26.

A clearance recess 51 for allowing the turning-supporting member 26 to be attached to the housing 3 from above the housing 3 is formed, in a circumferential direction, at a portion of the small-diameter hole 54 of the inner circumferential wall 52 of the turning-supporting member 26.

The housing 3 includes a flange portion 58 which protrudes from the outer circumferential wall 3*d* toward the large-diameter hole 53 of the turning-supporting member 26. The flange portion 58 has a transmitting surface 59 which transfers, to the turning-supporting member 26, an upward force that acts on the pivotally supporting portion 28 of the housing 3. At a step portion 55 of the turning-supporting member 26 between the large-diameter hole 53 and the small-diameter hole 54, a receiving surface 56 which receives the upward force transmitted from the transmitting surface 59 of the flange portion 58 is formed. A gap D1 is formed between a lower surface of the turning-supporting member 26 and an upper surface 1*a* of a table 1.

A diameter of the large-diameter hole 53 is set larger than a diameter of the flange portion 58. A diameter of the small-diameter hole 54 is set larger than a diameter of the outer circumferential wall 3*d* of the housing 3 by a length equivalent to an engagement gap D2.

The turning-supporting member 26 includes a cover portion 50 which protrudes radially inward from the inner circumferential wall 52 above the clearance recess 51 so as to abut on the outer circumferential wall 3*d* of the housing 3. In this way, the cover portion 50 above the clearance recess 51 is externally fitted to the outer circumferential wall 3*d* of the housing 3. This enables preventing a foreign matter such as chips generated during an operation related to the workpiece W from entering a gap between the small-diameter hole 54 and the outer circumferential wall 3*d* of the housing 3.

In Embodiment 3, a case where the clearance recess 51 is in the form of a groove has been taken as an example, but the present invention is not limited to this. Alternatively, a configuration may be employed in which the cover portion 50 is a member separate from the turning-supporting member 26, the clearance recess 51 is in the form of a notch, and this separate member is fitted in between the outer circumferential wall 3*d* of the housing 3 and the clearance recess 51.

An upper surface of the upper wall 3*a* of the housing 3 is an inclined surface which inclines downward in a radially outward direction. An upper surface of the cover portion 50 of the turning-supporting member 26 is also an inclined surface continuous with the inclined surface of the upper wall 3*a* of the housing 3. Accordingly, chips generated from an operation related to the workpiece W flow easily and are thus prevented from accumulating on the upper surfaces.

As illustrated in FIGS. 8 and 10, an unclamp chamber 19 formed between the upper wall 3*a* of the housing 3 and a piston 11 is communicated with a pressurized oil supply-and-discharge port 21 for unclamping, which pressurized oil supply-and-discharge port 21 is provided in a barrel part 3*c* of the housing 3. A clamp chamber 15 formed between a lower wall 3*b* of the housing 3 and the piston 11 is communicated with a pressurized oil supply-and-discharge port 17 for clamping, which pressurized oil supply-and-discharge port 17 is provided in the barrel part 3*c* of the housing 3.

A table pressurized oil supply-and-discharge port 61 through which pressurized oil is supplied to and discharged from the unclamp chamber 19 is provided to the table 1. A table pressurized oil supply-and-discharge port 62 through which pressurized oil is supplied to and discharged from the clamp chamber 15 is provided to the table 1.

The annular groove 63 connected to the table pressurized oil supply-and-discharge port 61 and the pressurized oil supply-and-discharge port 21 is provided along an entire circumference of the barrel part 3*c* of the housing 3 in a circumferential direction between an O-ring 65 and an O-ring 66 which are mounted to the barrel part 3*c* of the housing 3. The annular groove 64 connected to the table pressurized oil supply-and-discharge port 62 and the pressurized oil supply-and-discharge port 17 is provided along an entire circumference of the barrel part 3*c* of the housing 3 in the circumferential direction between the O-ring 66 and an O-ring 67 which are mounted to the barrel part 3*c* of the housing 3.

The turning-supporting member 26 is attached to the housing 3 in the following manner.

(a) to (c) of FIG. 11 are vertical cross-sectional views each illustrating a detailed aspect in which the turning-supporting member 26 is attached to the housing 3 from above the housing 3.

First, as illustrated in (a) of FIG. 11, the turning-supporting member 26 is arranged above the link-type clamping device 2B in an unclamping state. Then, the turning-supporting member 26 is lowered, such that the clamp arm 30 and the link member 33 of the link-type clamping device 2B in the unclamping state pass through a space formed by the inner circumferential wall 52 of the turning-supporting member 26.

Next, the turning-supporting member 26 is moved in a horizontal direction such that the pivotably supporting portion 28 of the housing 3 becomes closer to the inner circumferential wall 52 of the turning-supporting member 26. Subsequently, while a portion of the turning-supporting member 26 which portion is on a side opposite to the pivotably supporting portion 28 is held, a portion of the turning-supporting member 26 which portion is on a pivotably supporting portion 28 side is lowered so as to tilt the turning-supporting member 26.

Then, the turning-supporting member 26 is translated in an upper left direction such that a portion of the clearance recess 51 of the turning-supporting member 26 which portion is on the pivotably supporting portion 28 side becomes closer to a portion of the outer circumferential wall 3*d* of the housing 3 which portion is on the pivotably supporting portion 28 side. Next, as illustrated in (b) and (c) of FIG. 11, with the portion of the turning-supporting member 26 which portion is on the pivotably supporting portion 28 side serving as a fulcrum, the turning-supporting member 26 is turned counterclockwise with respect to the fulcrum such that the portion of the turning-supporting member 26 which portion is on the side opposite to the pivotably supporting portion 28 is lowered. Subsequently, the receiving surface 56 between the large-diameter hole 53 and the small-diameter hole 54 of the turning-supporting member 26 abuts on the transmitting surface 59 of the flange portion 58 of the housing 3. Thus, the turning-supporting member 26 is attached to the housing 3 as illustrated in (d) of FIG. 11.

Embodiment 3 brings about the following advantages.

Since the clearance recess 51 is formed in the inner circumferential wall 52 of the turning-supporting member 26, the turning-supporting member 26 is attached to the housing 3 from above the housing 3 so as to avoid the pivotably supporting portion 28 which protrudes radially outward from the outer circumferential wall 3*d* of the housing 3 and upward from the housing 3. It is thus possible to provide the link-type clamping device which is capable of firmly pressing a workpiece W downward by effective use of a force of the rod 12 and is excellent in assemblability.

Since (i) the transmitting surface 59 which transmits to the turning-supporting member 26 an upward force that acts on the housing 3 is provided at the flange portion 58 which protrudes from the outer circumferential wall 3d of the housing 3 toward the large-diameter hole 53, and (ii) the receiving surface 56 which receives the upward force transmitted from the transmitting surface 59 is provided at the step portion 55 between the large-diameter hole 53 and the small-diameter hole 54, an upward force that acts on the housing 3 from the link member 33 in a clamping operation can be reliably received by a simple configuration with a reduced number of components including neither the retaining ring 38 nor the wedge members 41.

Since the turning-supporting member 26 includes the cover portion 50 which protrudes above the clearance recess 51 so as to abut on the outer circumferential wall 3d of the housing 3, it is possible to prevent a foreign matter such as chips from entering a gap between the small-diameter hole 54 of the turning-supporting member 26 and the outer circumferential wall 3d of the housing 3.

The annular groove 63 connected to the table pressurized oil supply-and-discharge port 61 and the pressurized oil supply-and-discharge port 21 is provided in the circumferential direction, and the annular groove 64 connected to the table pressurized oil supply-and-discharge port 62 and the pressurized oil supply-and-discharge port 17 is provided in the circumferential direction. Accordingly, the table pressurized oil supply-and-discharge port 61 faces the annular groove 63. Further, the table pressurized oil supply-and-discharge port 62 faces the annular groove 64. As such, no matter what turning angle position the housing 3 may be turned to, pressurized oil can be supplied from the table pressurized oil supply-and-discharge port 61 to the pressurized oil supply-and-discharge port 21 through the annular groove 63, and pressurized oil can be supplied from the table pressurized oil supply-and-discharge port 62 to the pressurized oil supply-and-discharge port 17 through the annular groove 64.

The above embodiments can be modified as follows.

The present invention is applicable also to a rotary clamping device in which the clamp arm 30 turns about an axis and is raised and lowered.

Although the above description has taken an example where the receiving surface 27 is a flat surface, the receiving surface 27 may be a curved surface.

A cross section of the retaining ring 38 is not limited to a circular shape, and may be an elliptic shape or a quadrangle shape.

Although the above description has discussed an example case where the number of wedge members 41 arranged is three, the number may be four or more.

A means for driving the piston 11 and the rod 12 may be a means that uses hydraulic pressure for clamping and a spring for returning or a means that uses a spring for clamping and hydraulic pressure for returning, in place of the means of a hydraulic double-acting type described above as an example. A pressurized fluid used for such a driving means may be a gas such as compressed air, in place of a liquid such as pressurized oil.

The clamping devices 2 and 2A can each be placed in a manner different from that illustrated in the drawings. That is, the clamping devices 2 and 2A can each be alternatively placed upside down or placed obliquely.

Embodiment 4

The following description will discuss Embodiment 4 of the present invention with reference to FIG. 12.

FIG. 12 illustrates Embodiment 4 of the present invention. (a) of FIG. 12 is a vertical cross-sectional view of a link-type clamping device 2C in a clamping state. (b) of FIG. 12 is an enlarged cross-sectional view of a portion D illustrated in (a) of FIG. 12.

In Embodiment 4, a table 1 has a hole 1b, at an upper part of which a taper face 68 is formed so as to extend increasingly outward in an upward direction. A seating portion 69 to be engaged with the taper face 68 is formed on an upper wall 3a of the housing 3 so as to extend increasingly outward in an upward direction. The housing 3 is inserted into the hole 1b so as to be turnable about an axis of the housing 3 while maintaining the axis at a constant position. The seating portion 69 of the housing 3 is supported from below by the taper face 68 which is formed in adjacent to an upper surface 1a of the table 1. This allows the housing 3 to be inserted into the hole 1b such that the axis of the housing 3 coincides with an axis of the hole 1b.

Note that in Embodiment 4, the housing 3 is hermetically fitted into the hole 1b in the table 1 in a state where the housing 3 has been turned about the axis of the housing 3 in a desired direction.

Further, in Embodiment 4, in place of the above-described configuration in which the seating portion 69 in a tapered shape is formed on the outer circumferential wall of the housing 3, a configuration may be alternatively employed in which (i) the seating portion 69 is formed horizontally so as to be parallel to the upper surface 1a of the table 1 and (ii) the seating portion 69 thus horizontally formed is supported by the upper surface 1a from below.

As illustrated in (b) of FIG. 12, an upper surface of a male screw portion 70 of the housing 3 constitutes a transmitting surface 37. A female screw portion 71 of an annular turning-supporting member 26 is fitted to the male screw portion 70 of the housing 3. The turning-supporting member 26 has a bolt insertion hole 48, through which a bolt 46 is fixed to the table 1. In this way, the turning-supporting member 26 fixes, to the table 1, the housing 3 which was turned toward a desired turning angle position about the axis of the housing 3 while maintaining the axis at a constant position when a clamping position was set. At this time, there is a gap between the upper surface 1a of the table 1 and a lower surface of the turning-supporting member 26. Accordingly, as with the above-described configuration illustrated in FIGS. 1 and 3, a downward fastening force of the bolt 46 acts in a direction in which the housing 3 is pressed against the table 1 via the female screw portion 71 of the turning-supporting member 26 and the male screw portion 70 of the housing 3. This enables reliably securing the housing 3 to the table 1.

Since the turning-supporting member 26 is provided so as to allow the housing 3 to turn toward a desired turning angle position about the axis of the housing 3 while maintaining the axis at a constant position, a clamp arm 30 whose position is changed to a desired turning angle position is maintained at a constant position in a vertical direction, unlike the conventional techniques.

In the link-type clamping device 2C of Embodiment 4, the male screw portion 70 of the housing 3 and the female screw portion 71 of the turning-supporting member 26 are fitted to each other. As such, the housing 3 is supposed to be displaced in the vertical direction when the housing 3 is turned about the axis of the housing 3 with respect to the female screw portion 71 of the turning-supporting member 26. However, since the seating portion 69 of the housing 3 is received from below by the taper face 68 at the hole 1b in the table 1, displacement of the housing 3 itself in the vertical direction does not occur. Accordingly, the clamp arm 30 whose position is changed to a desired turning angle position is not displaced in the vertical direction. Further, in a release state in which clamping has been released and the clamp arm 30 has swung away from the workpiece W, changing a position of the housing 3 to a desired turning angle position does not cause displacement of the clamp arm 30. Further, a preadjusted horizontal state of the clamp arm 30 at a clamping position is also maintained. That is, it is possible to change a clamping position 2C accurately to a desired turning angle position about the axis.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

2: clamping device, 3: housing, 12: rod, 17: pressurized oil supply-and-discharge port, 21: pressurized oil supply-and-discharge port, 26: turning-supporting member, 27: receiving surface, 28: pivotably supporting portion, 30: clamp arm, 33: link member, 34: link upper part, 35: link lower part, 37: transmitting surface, 38: retaining ring, 41: wedge member, 46: bolt (lock member), 50: cover portion, 51: clearance recess, 52: inner circumferential wall, 53: large-diameter hole, 54: small-diameter hole, 55: step portion, 56: receiving surface, 58: flange portion, 59: transmitting surface, 63: annular groove, 64: annular groove, 68: taper face, 69: seating portion, 70: male screw portion, 71: female screw portion, B: receiving member

The invention claimed is:

1. A link-type clamping device, comprising:
   a housing (3) which is inserted into a hole (1b) of a table (1) and into which a rod (12) is inserted so as to be movable in a vertical direction;
   a clamp arm (30) connected to an upper part of the rod (12) so as to be swingable in the vertical direction;
   a link member (33) including a link lower part (35) connected swingably to the housing (3) and a link upper part (34) connected swingably to the clamp arm (30);
   an annular turning-supporting member (26) externally fitted to an outer circumferential portion of the housing (3) which turns when a clamping position is set, the housing (3) turning toward a desired turning angle position about an axis of the housing (3) while maintaining the axis at a constant position; and
   a bolt (46) which fastens the housing (3) to the turning-supporting member (26) at the desired turning angle position,
   a portion of the housing (3) being supported by the table (1),
   a gap being formed between the table (1) and the turning-supporting member (26),
   a fastening force of the bolt (46) acting in a direction in which the housing (3) is pressed against the table (1) via the turning-supporting member (26).

2. The link-type clamping device as set forth in claim 1, further comprising a receiving member (B) provided between the housing (3) and the turning-supporting member (26) so as to receive an upward force that acts on the housing (3) from the link member (33) in a clamping operation,
   the housing (3) having a transmitting surface (37) which transmits, to the receiving member (B), the upward force acting on the housing (3),
   the turning-supporting member (26) having a receiving surface (27) which receives the upward force transmitted to the receiving member (B).

3. The link-type clamping device as set forth in claim 2, wherein the receiving member (B) includes a retaining ring (38) arranged along an outer circumference of the housing (3).

4. The link-type clamping device as set forth in claim 2, wherein the receiving member (B) includes a plurality of wedge members (41) arranged at predetermined intervals along an outer circumference of the housing (3).

5. The link-type clamping device as set forth in claim 3, wherein the turning-supporting member (26) is provided such that the turning-supporting member (26) is movable toward an upper side of the housing (3) so as to allow the retaining ring (38) to be mounted between the housing (3) and the turning-supporting member (26) from a lower side of the housing (3).

6. The link-type clamping device as set forth in claim 1, wherein: the housing (3) includes a pivotably supporting portion (28) for connecting the link lower part (35) to the housing (3), the pivotably supporting portion (28) protruding radially outward from an outer circumferential wall (3d) of the housing (3) and upward from the housing (3); and the turning-supporting member (26) includes an inner circumferential wall (52) including a clearance recess (51) for allowing the turning-supporting member (26) to be attached to the housing (3) from above the housing (3).

7. The link-type clamping device as set forth in claim 6, wherein: the inner circumferential wall (52) of the turning-supporting member (26) has a large-diameter hole (53) and a small-diameter hole (54), which are provided in this order from a lower side of the turning-supporting member (26); and the clearance recess (51) is formed, in a circumferential direction, at a portion of the small-diameter hole (54).

8. The link-type clamping device as set forth in claim 7, wherein: the housing (3) includes a flange portion (58) protruding from the outer circumferential wall (3d) toward the large-diameter hole (53); the flange portion (58) has a transmitting surface (59) which transmits, to the turning-supporting member (26), an upward force acting on the housing (3); and a receiving surface (56) which receives the upward force transmitted from the transmitting surface (59) is formed at a step portion (55) between the large-diameter hole (53) and the small-diameter hole (54).

9. The link-type clamping device as set forth in claim 6, wherein the turning-supporting member (26) includes a cover portion (50) which protrudes from the inner circumferential wall (52) above the clearance recess (51) so as to abut on the outer circumferential wall (3d) of the housing (3).

10. The link-type clamping device as set forth in claim 1, wherein the housing (3) includes: annular grooves (63, 64) each formed in an outer circumferential wall of the housing (3) in a circumferential direction; and fluid supply-and-discharge ports (17, 21) respectively formed in the annular grooves (63, 64) so as to supply and discharge a pressurized fluid that causes the rod (12) to move in the vertical direction.

\* \* \* \* \*